(12) United States Patent
Amirsolaimani et al.

(10) Patent No.: US 11,808,917 B2
(45) Date of Patent: Nov. 7, 2023

(54) ASSEMBLIES OF ANISOTROPIC OPTICAL ELEMENTS AND METHODS OF MAKING

(71) Applicant: META PLATFORMS TECHNOLOGIES, LLC, Menlo Park, CA (US)

(72) Inventors: Babak Amirsolaimani, Redmond, WA (US); Scott Charles McEldowney, Redmond, WA (US); Andrew John Ouderkirk, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 147 days.

(21) Appl. No.: 17/246,357

(22) Filed: Apr. 30, 2021

(65) Prior Publication Data

US 2021/0255453 A1 Aug. 19, 2021

Related U.S. Application Data

(63) Continuation of application No. 16/222,796, filed on Dec. 17, 2018, now Pat. No. 11,022,791.

(Continued)

(51) Int. Cl.
*G02B 26/00* (2006.01)
*G02B 27/28* (2006.01)
(Continued)

(52) U.S. Cl.
CPC ........... *G02B 26/00* (2013.01); *G02B 5/3083* (2013.01); *G02B 27/288* (2013.01); *G03H 1/0248* (2013.01)

(58) Field of Classification Search
CPC .... G02B 26/00; G02B 5/3083; G02B 27/288; G02B 5/1876; G02B 5/3016;
(Continued)

(56) References Cited

U.S. PATENT DOCUMENTS

| 9,296,193 B2 | 3/2016 | Burggraf et al. |
| 2004/0080938 A1 | 4/2004 | Holman et al. |

(Continued)

FOREIGN PATENT DOCUMENTS

| CN | 1406341 A | 3/2003 |
| CN | 1959499 A | 5/2007 |

(Continued)

OTHER PUBLICATIONS

Burch J., et al., "Conformable Holographic Metasurfaces," Scientific Reports, Jul. 3, 2017, vol. 7 (1), XP055552948, 7 pages.

(Continued)

*Primary Examiner* — Robert E. Tallman
(74) *Attorney, Agent, or Firm* — Morgan, Lewis & Bockius LLP

(57) ABSTRACT

An optical assembly includes a first flexible membrane and a first optical element coupled with at least a first portion of the first flexible membrane. The optical assembly also includes a substrate having a curved surface. The first optical element is coupled to the curved surface of the substrate with the first flexible membrane. A method for making an optical assembly includes obtaining a first flexible membrane and a first optical element. The method includes coupling the first optical element with at least a first portion of the first flexible membrane and coupling, with the first flexible membrane, the first optical element to a curved surface of a substrate.

20 Claims, 10 Drawing Sheets

Related U.S. Application Data

(60) Provisional application No. 62/673,787, filed on May 18, 2018.

(51) Int. Cl.
 G02B 5/30 (2006.01)
 G03H 1/02 (2006.01)

(58) Field of Classification Search
 CPC ............. G03H 1/0248; G03H 2222/31; G03H 2270/31; G03H 1/0272
 See application file for complete search history.

(56) References Cited

U.S. PATENT DOCUMENTS

| | | | |
|---|---|---|---|
| 2008/0278675 A1 | 11/2008 | Escuti et al. | |
| 2013/0335683 A1 | 12/2013 | Escuti et al. | |
| 2014/0252666 A1 | 9/2014 | Tabirian et al. | |
| 2016/0021733 A1* | 1/2016 | Xie | H05K 3/281 29/846 |
| 2016/0026092 A1 | 1/2016 | Tabirian et al. | |
| 2020/0356047 A1* | 11/2020 | Di Falco | G03H 1/0272 |

FOREIGN PATENT DOCUMENTS

| | | |
|---|---|---|
| CN | 103180945 A | 6/2013 |
| CN | 103270448 A | 8/2013 |
| CN | 103770969 A | 5/2014 |
| JP | H03168613 A | 7/1991 |
| JP | H08278491 A | 10/1996 |
| WO | 2019084334 A1 | 5/2019 |
| WO | 2019102183 A1 | 5/2019 |

OTHER PUBLICATIONS

Chulwoo O., "Broadband Polarization Gratings for Efficient Liquid Crystal Display, Beam Steering, Spectropolarimetry, and Fresnel Zone Plate," PhD Thesis, North Carolina State University, Jan. 31, 2009 [retrieved on Apr. 14, 2021], 16 pages, XP055795346, retrieved from the Internet: URL: https://www.researchgate.net/publication/241361478_Broadband_polarization_gratings_for_efficient_liquid_crystal_display_beam_steering_spectropolarimetry_and_Fresnel_zone_plate.

Extended European Search Report for European Application No. EP19802779.9, dated Apr. 23, 2021, 11 Pages.

International Preliminary Report Patentability for International Application No. PCT/US2019/023232, dated Dec. 3, 2020, 9 Pages.

International Search Report and Written Opinion for International Application No. PCT/US2019/023232, dated Jul. 5, 2019, 12 Pages.

Kamali S.M., et al., "A Review of Dielectric Optical Metasurfaces for Wavefront Control," arXiv:1804.09802vI [physics.optics], XP081230163, pp. 1-25.

Notification of the First Office Action dated Dec. 23, 2021 for Chinese Application No. 201980033245.5, filed Mar. 20, 2019, 33 pages.

Office Action dated May 12, 2022 for Chinese Application No. 201980033245.5, filed Mar. 20, 2019, 21 pages.

Amirsolaimani, Office Action, U.S. Appl. No. 16/222,796, dated Oct. 28, 2020, 8 pgs.

Amirsolaimani, Notice of Allowance, U.S. Appl. No. 16/222,796, dated Sep. 2, 8 pgs.

Office Action dated Mar. 21, 2023 for European Patent Application No. 19802779.9, filed on Mar. 20, 2019, 6 pages.

* cited by examiner

ASSEMBLIES OF ANISOTROPIC OPTICAL ELEMENTS AND METHODS OF MAKING

RELATED APPLICATIONS

This application is a continuation application of U.S. patent application Ser. No. 16/222,796, filed Dec. 17, 2018, entitled "Assemblies of Anisotropic Optical Elements and Methods of Making," which claims priority and benefit to U.S. Provisional Application No. 62/673,787, filed May 18, 2018, entitled "Methods for Transferring an Optical Element between Substrates," both of which are hereby incorporated by reference in their entirety.

TECHNICAL FIELD

This relates generally to optical elements, and in particular to assemblies of anisotropic optical elements and method of making.

BACKGROUND

Polarization volume holographic (PVH) elements (also called herein polarization volume holograms, or PVH) and geometric phase (GP) optical elements have gained increasing interest in optics, for example in beam steering devices, waveguides, and display technologies.

Conventionally, polarization volume holograms and geometric phase optical elements are prepared on rigid and flat surfaces due to challenges in preparing such elements on non-rigid and/or non-flat surfaces. However, for many applications, having polarization volume holograms and/or geometric phase optical elements on non-rigid and/or non-flat surfaces would be beneficial.

Therefore, there is a need for improved methods for providing polarization volume holograms and geometric phase optical elements on flexible and/or curved substrates.

SUMMARY

Accordingly, there is a need for techniques for making polarization volume holograms and geometric phase optical elements on non-rigid and/or non-flat surfaces.

The above deficiencies and other problems associated with making polarization volume holograms and/or geometric phase optical elements on non-flat and/or non-rigid surfaces are resolved by the methods described herein.

In accordance with some embodiments, a method includes obtaining a first optical assembly including a first optical element and a first flexible membrane. The first optical element has a first optical element surface and a second optical element surface that is opposite to the first optical element surface. The first flexible membrane has a first membrane surface and a second membrane surface that is opposite to the first membrane surface. The first optical element is a geometric phase optical element or a polarization volume hologram optical element. The second optical element surface of the first optical element is coupled with at least a first portion of the first membrane surface of the first flexible membrane. The method also includes coupling the first optical element with the first flexible membrane attached thereto to a target substrate.

In accordance with some embodiments, an optical assembly includes a first optical element having a first optical element surface and a second optical element surface that is opposite to the first optical element surface. The first optical element is a geometric phase optical element or a polarization volume hologram optical element. The optical assembly also includes first flexible membrane having a first membrane surface and a second membrane surface that is opposite to the first membrane surface. The second optical element surface of the first optical element is coupled with at least a first portion of the first membrane surface of the first flexible membrane.

Thus, the disclosed embodiments provide for optical assemblies, including polarization volume holograms and/or geometric phase optical elements on non-rigid and/or non-flat surfaces, and methods of making such assemblies by transferring the polarization volume holograms and/or geometric phase optical elements from flat and rigid surfaces to non-rigid and/or non-flat surfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
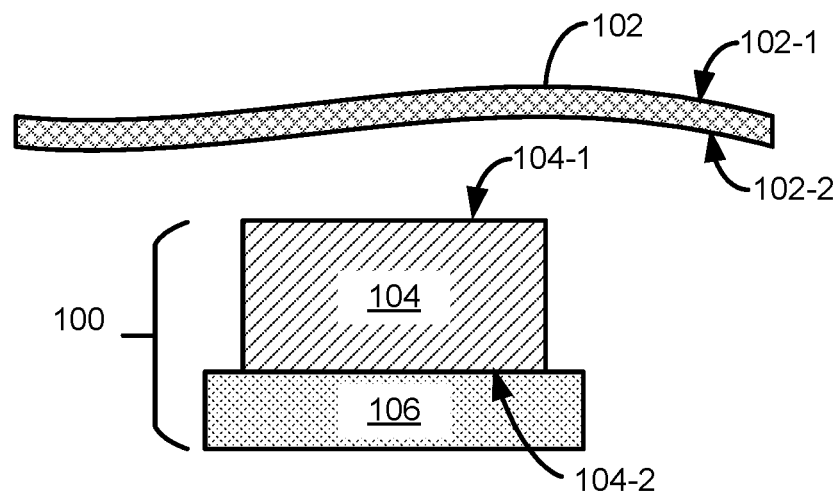
FIG. 1A is a cross-sectional schematic illustration of an optical assembly and a membrane in accordance with some embodiments.

These figures are not drawn to scale unless indicated otherwise.

DETAILED DESCRIPTION

The present disclosure describes methods for transferring an optical element onto a target substrate. In some embodiments, a first surface of the optical element is coupled to first flexible membrane (e.g., optically clear adhesives, such as optically clear adhesive tapes and optically clear adhesive films), so that the optical element can be transferred onto the target substrate. The methods described herein enable simplified and more efficient fabrication of optical elements on flexible or non-flat substrates. In particular, the methods described herein provide polarization volume holograms (PVH) and/or geometric phase (GP) optical elements on flexible or non-flat surfaces.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first surface could be termed a second surface, and, similarly, a surface element could be termed a first surface, without departing from the scope of the various described embodiments. The first surface and the second surface are both surface, but they are not the same surface.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Methods of transferring an optical element, such as a PVH or GP optical element, from a rigid and flat substrate onto a flexible, elastic and/or non-flat substrate, and optical assemblies achieved by such methods are described below with respect to FIGS. 1A-1H.

FIG. 1A is a cross-sectional schematic illustration of structure 100 including optical element 104 formed on a substrate 106, and membrane 102 in accordance with some embodiments. Optical element 104 includes surface 104-1 and surface 104-2 opposite to surface 104-1. In some embodiments, optical element 104 is a grating, a lens, or an axicon. In some embodiments, optical element 104 is a PVH. In some embodiments, optical element 104 is a GP optical element. GP optical elements are described below with reference to FIGS. 3A-3D and FIGS. 4A-4D, and PVH optical elements are described below with reference to FIGS. 5A-5D and FIGS. 6A-6D. In some embodiments, optical element 104 includes polymerized anisotropic molecules, such as polymerized liquid crystals and/or photopolymers (e.g., cured photopolymers). In some embodiments, optical element 104 includes a layer of liquid crystals oriented on a photoalignment layer (e.g., a layer including organic or inorganic compounds including photosensitive groups). Manufacturing of optical elements such as PVH and/or GP elements with high-quality optical properties can be achieved by manufacturing such optical elements on rigid and substantially flat substrates (e.g., substrate 106) using known processes. The optical properties of PVH and GP elements include, e.g., polarization selectivity, wavelength selectivity and/or incident angle selectivity. In FIG. 1A, optical element 104 is manufactured on, and thereby is coupled to (or attached to) substrate 106. Substrate 106 is made of a rigid material (e.g., glass, silicon or plastic) suitable for manufacture of optical element 104 by methods known in the art, e.g., by photoalignment and/or holographic alignment. Substrate 106 is also substantially flat which enables easy alignment of the polarization directed materials (e.g., liquid crystals and/or photopolymers). FIG. 1A also shows membrane 102 before being attached to optical element 104. Membrane 102 is a flexible membrane including surface 102-1 and surface 102-2 opposite to surface 102-1. At least a portion of surface 102-2 is configured to be coupled to (or attached to) surface 104-1 of optical element 104, as shown in FIG. 1B.

Figure 1B:
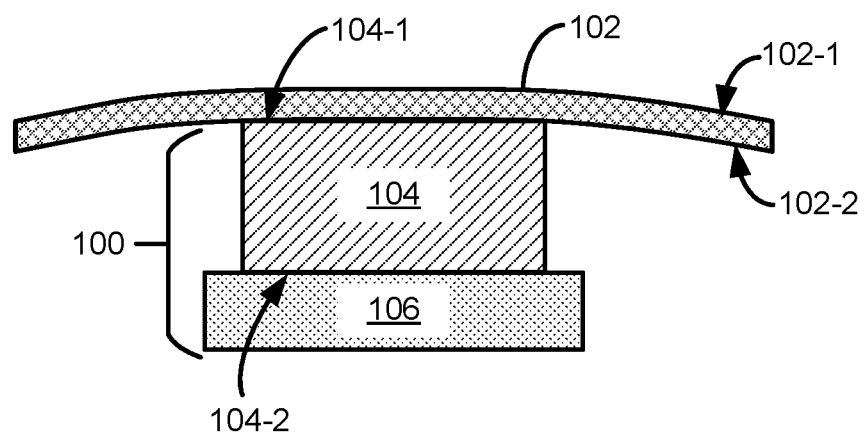
FIG. 1B is a cross-sectional schematic illustration of an optical assembly and a membrane in accordance with some embodiments.

FIG. 1B is a cross-sectional schematic illustration of structure 100 and membrane 102 in accordance with some embodiments. In FIG. 1B, surface 102-2 of membrane 102 is coupled to surface 104-1 of optical membrane 104. Surface 102-2 of membrane 102 is coated with one or more adhesives and is thereby adhesively attached to surface 104-1 of optical element 102-2. In some embodiments, both surfaces 102-1 and 102-2 of membrane 102 are coated with one or more adhesives. In some embodiments, membrane 102 is an optically clear adhesive (OCA) tape or a film with a low-tack pressure-sensitive adhesive. For example, membrane 102 is a one-sided or a double-sided OCA supplied by 3M™.

Figure 1C:
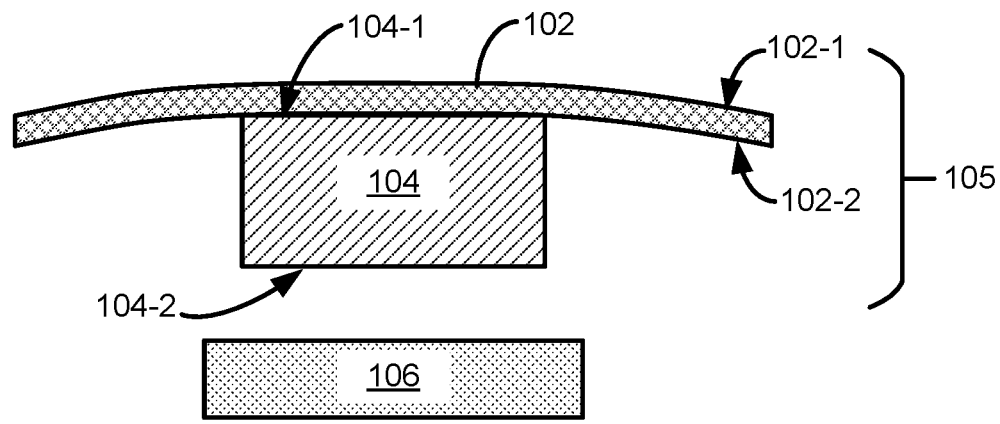
FIG. 1C is a cross-sectional schematic illustration of an optical assembly in accordance with some embodiments.

FIG. 1C is a cross-sectional schematic illustration of optical assembly 105 in accordance with some embodiments. In FIG. 1C, optical element 104 coupled to membrane 102 is detached from substrate 106. In some embodiments, detaching optical element 104 includes lifting off, or peeling off, membrane 102 from substrate 106. After detaching, optical element 104 is thereby transferred from substrate 106 onto flexible membrane 102 forming optical assembly 105. In some embodiments, optical element 104 of assembly 105 does not include a photoalignment alignment layer. For example, a photoalignment layer used for alignment of liquid crystals during manufacture of liquid crystal PVH and/or GP element remains attached to substrate 106 and is therefore detached from optical element 104. As another example, optical element 104 is manufactured with methods known in the art that do not require an application of a photoalignment layer.

Figure 1D:
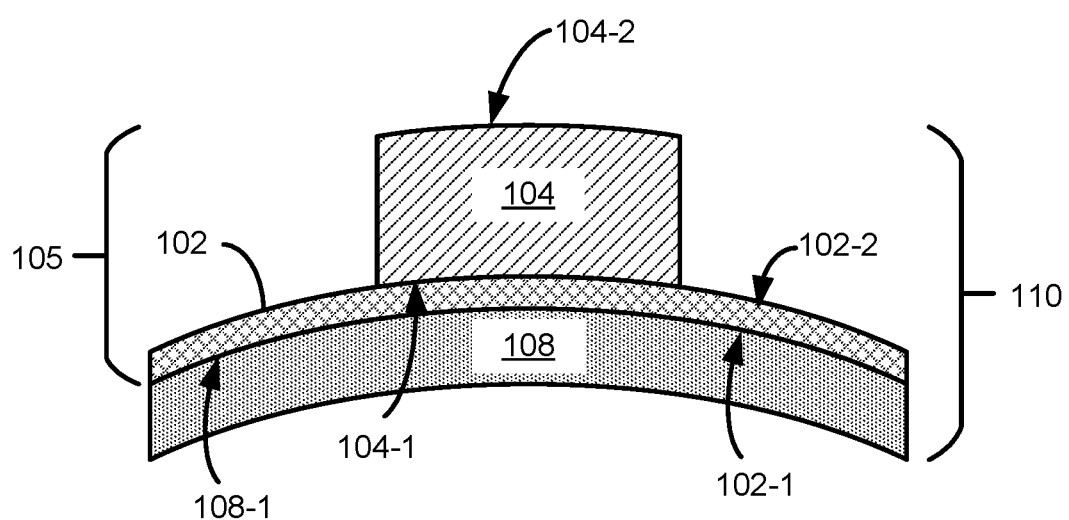
FIG. 1D is a cross-sectional schematic illustration of an optical assembly in accordance with some embodiments.

FIG. 1D is a cross-sectional schematic illustration of optical assembly 110 in accordance with some embodiments. In FIG. 1D, surface 102-1 of membrane 102 of optical assembly 105 is coupled with surface 108-1 of substrate 108, thereby forming optical assembly 110. In some embodiments, surface 102-1 includes, similar to surface 102-2, one or more adhesives and surface 102-1 is adhesively attached to surface 108-1. Alternatively, surface 108-1 of substrate 108 includes one or more adhesives and surface 108-1 is adhesively attached to surface 102-1 of membrane 102-1. As optical element 105 including flexible membrane 102 and optical element 104 is coupled to substrate 108, optical assembly 105 is curved such that the curvature of optical assembly 105 corresponds to the curvature of surface 108-1. In FIG. 1D, surface 108-1 of substrate 108 has a convex shape. In some embodiments, surface 108-1 has a concave shape, a spherical shape, an aspherical shape or a freeform shape. In some embodiments, substrate 108 is a lens or a grating. Optical assembly 1D has unconventional optical properties compared to a lens assembly including only traditional lenses. In some embodiments, a PVH or GP element provides angular selectivity, wavelength selectivity and/or polarization selectivity to optical assembly 110 in addition to, e.g., providing optical power.

Figure 1E:
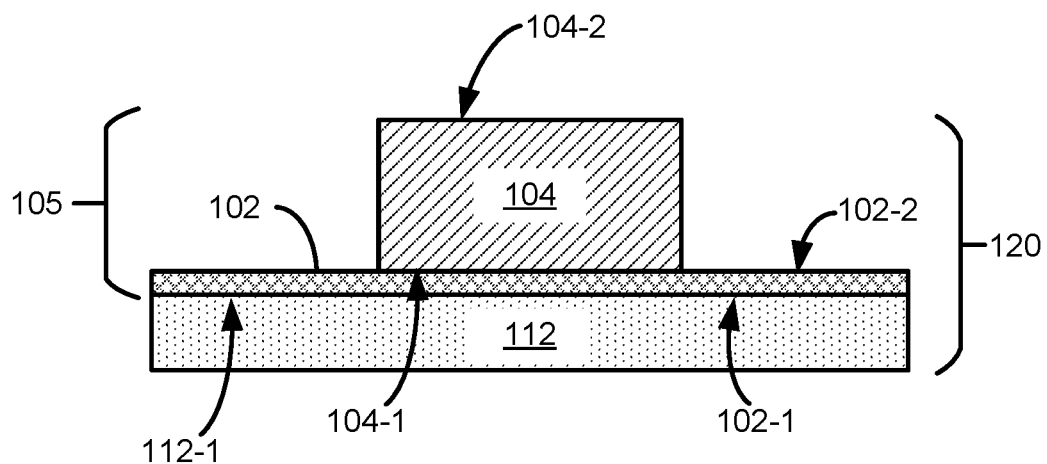
FIG. 1E is a cross-sectional schematic illustration of an optical assembly in accordance with some embodiments.
Figure 1F:
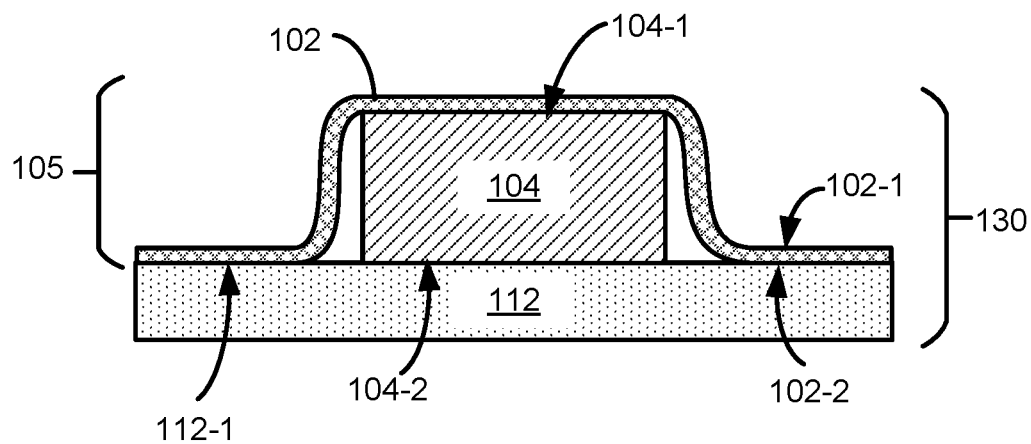
FIG. 1F is a cross-sectional schematic illustration of an optical assembly in accordance with some embodiments.

FIG. 1E is a cross-sectional schematic illustration of optical assembly 120 in accordance with some embodiments. In FIG. 1E, surface 102-1 of membrane 102 of optical assembly 105 is coupled to surface 112-1 of substrate 112, thereby forming optical assembly 120. In some embodiments, substrate 112 is a flexible substrate. In some embodiments, substrate 112 is an elastic (e.g., stretchable) substrate. For example, substrate 112 is made of a flexible and/or elastic polymer. FIG. 1F is a cross-sectional schematic illustration of optical assembly 130 in accordance with some embodiments. In FIG. 1F, a portion of surface 102-2 of membrane 102 of optical assembly 105 is coupled to surface 112-1 of substrate 112, thereby forming optical assembly 130. In FIG. 1F, optical element 104 is enclosed between membrane 102 and substrate 112 so that membrane 102 provides a seal surrounding optical element 104.

Figure 1G:
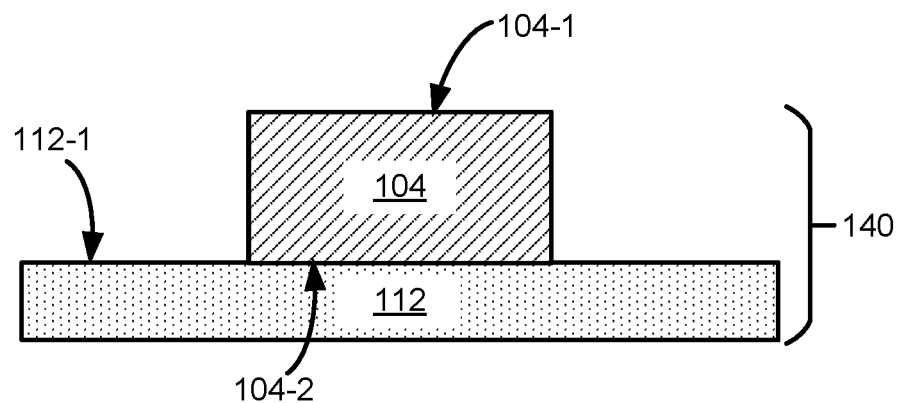
FIG. 1G is a cross-sectional schematic illustration of an optical assembly in accordance with some embodiments.

FIG. 1G is a cross-sectional schematic illustration of optical assembly 140 in accordance with some embodiments. Optical assembly 140 corresponds to optical assembly 130 described above with respect to FIG. 1F, except that optical assembly 140 does not include membrane 102. In some embodiments, membrane 102 is removed (e.g., by lifting off or peeling off) from top of optical element 104.

Figure 1H:
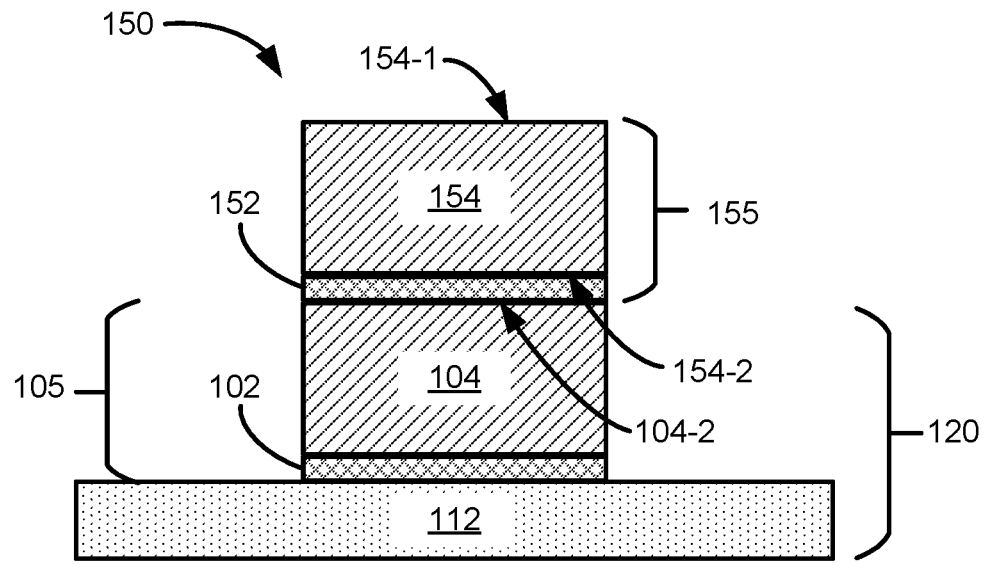
FIG. 1H is a cross-sectional schematic illustration of an optical assembly in accordance with some embodiments.

FIG. 1H is a cross-sectional schematic illustration of optical assembly 150 in accordance with some embodiments. Optical assembly 150 includes two or more optical assemblies stacked together (e.g., two, three, four, five, or more optical assemblies, such as optical assemblies 105, stacked together). In FIG. 1H, optical assembly 150 includes optical assembly 120 coupled with optical assembly 155, which corresponds to optical assembly 105 described with respect to FIG. 1C. Alternatively, optical assembly incudes optical assembly 140 described with respect to FIG. 1G coupled with optical assembly 155. Optical assembly 155 includes optical element 154 with surfaces 154-1 and 154-2 and membrane 152 coupled with surface 154-2 of optical element 154 and surface 104-2 of optical element 104. In the configuration of optical assembly 150, optical assembly 155 is transferred on top of optical assembly 120 so that membrane 152 is located between optical element 104 and optical element 154. In some embodiments, optical element 154 and optical element 104 are both PVH elements or GP elements. In some embodiments, optical elements 154 and 104 have similar optical properties (e.g., wavelength selectivity, polarization selectivity and/or angular selectivity). In some embodiments, optical properties of optical element 154 are distinct from optical properties of optical element 104. For example, optical element 154 is configured focus light with a first wavelength range and optical element is configured to focus light with a second wavelength range distinct from the first wavelength range. As another example, optical element 154 is configured to focus light with a first circular polarization and optical element 104 is configured to focus light with a second circular polarization distinct from the first circular polarization. In some embodiments, optical elements 154 and 104 are both lenses, gratings or axicons. In some embodiments, optical element 154 is a GP element and optical element 104 is a PVH element, or vice versa. In some embodiments, optical assembly 150 includes a combination of one or more of lenses, gratings and axicons.

Figure 1I:
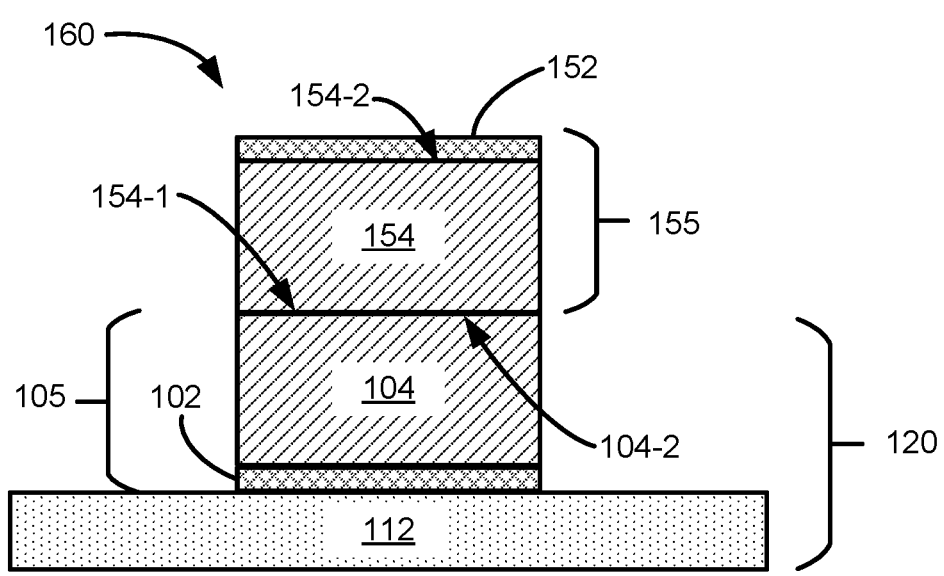
FIG. 1I is a cross-sectional schematic illustration of an optical assembly in accordance with some embodiments.

FIG. 1I is a cross-sectional schematic illustration of optical assembly 160 in accordance with some embodiments. Optical assembly 160 corresponds to optical element 150 described above with respect to FIG. 1H, except that in optical assembly 160, optical assembly 155 is positioned on top of optical assembly 120 so that surface 154-1 of optical element 154 is directly in contact with surface 104-2 of optical element 104 and surface 154-2 coupled with membrane 152 is positioned on top of optical assembly 160. Optionally, in some embodiments, membrane 152 is removed (e.g., membrane 152 is lifted off or peeled off of surface 154-2 of optical element 154).

Figure 1J:
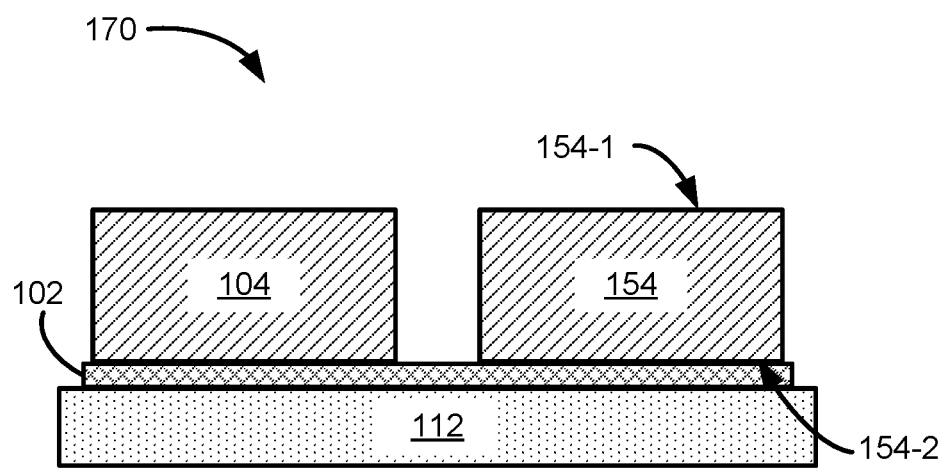
FIG. 1J is a cross-sectional schematic illustration of an optical assembly in accordance with some embodiments.

FIG. 1J is a cross-sectional schematic illustration of optical assembly 170 in accordance with some embodiments. Optical assembly 170 corresponds to optical assembly 150 described with respect to FIG. 1H, except that in optical assembly 170 optical element 154 is positioned next to optical element 104. In FIG. 1J, optical element 154 is positioned separate from optical element 104. In some embodiments, optical element 154 is positioned adjacent to (e.g., coupled with) optical element 104. In FIG. 1J, optical elements 104 and 154 are both positioned on membrane 102. In some embodiments, optical element 154 is coupled to substrate 112 with a distinct membrane (e.g., membrane 152 shown in FIG. 1H). In some embodiments, optical element 170 does not include membrane 102, similarly as described with respect to optical assembly 140 in FIG. 1G.

Figure 2B:
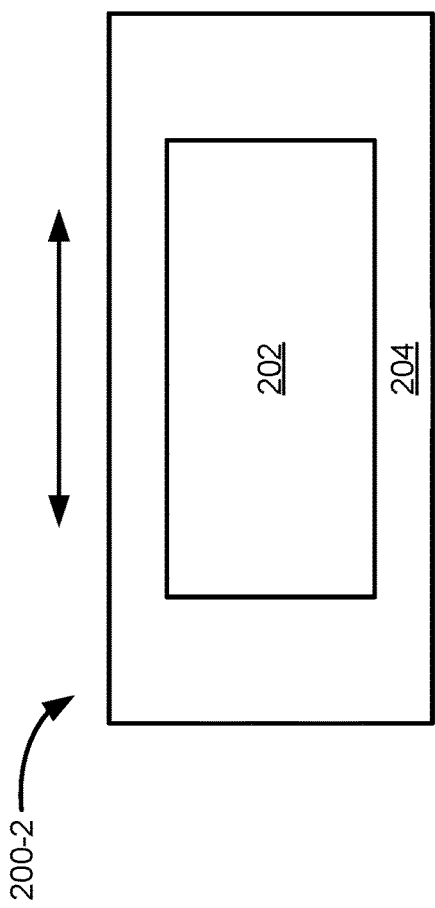
FIGS. 2A-2C are plane-view schematic illustrations of a stretchable optical assembly in accordance with some embodiments.
Figure 2A:
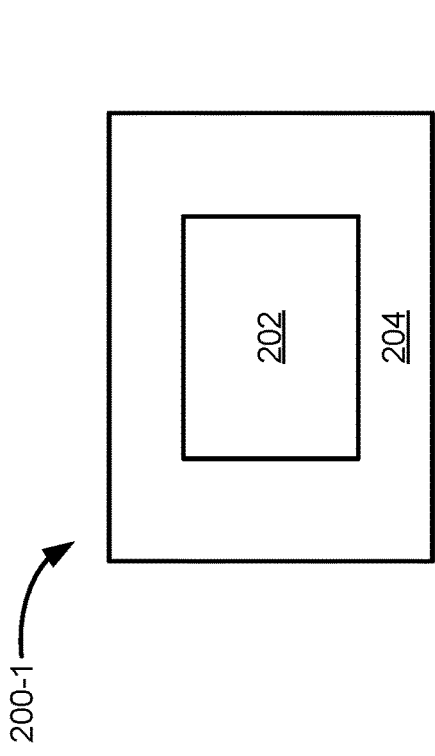
Figure 2C:
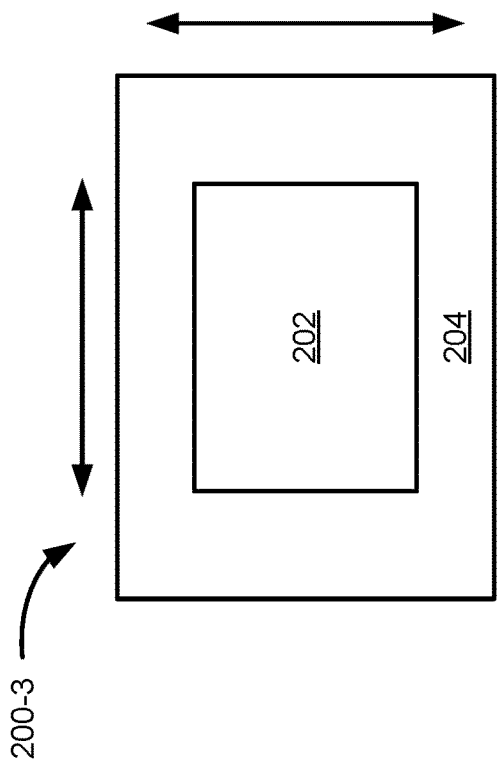

FIGS. 2A-2C are plane-view schematic illustrations of stretchable optical assembly 200 in accordance with some embodiments. Optical assembly 200 (e.g., optical assemblies 200-1, 200-2 and 200-3) includes optical element 202 corresponding to optical element 104 described above with respect to FIG. 1A. Optical element 202 is positioned on elastic substrate 204. In FIG. 2A, optical assembly 200-1 is in a non-stretched phase. In FIG. 2B, optical assembly 200-2, including substrate 204 and optical element 202, is stretched in one direction (e.g., as indicated with the horizontal arrow) without being stretched in other directions. In FIG. 2C, optical assembly 200 is stretched in two perpendicular directions (e.g., as indicated with the horizontal and vertical arrows). In some embodiments, elastic substrate 204 corresponds to membrane 102 (e.g., membrane 102 is an optically clear adhesive tape or film) described above with respect to FIG. 1A, except that substrate 204 is elastic, in addition to being flexible. In some embodiments, optical assembly 200 is stretched to become optical assembly 200-2 or optical assembly 200-3 before being coupled to a target substrate (e.g., substrate 108 described with respect to FIG. 1D or substrate 112 described with respect to FIG. 1E) while remaining stretched. In some embodiments, elastic substrate 204 corresponds to substrate 112 described with respect FIG. 1E. In such embodiments, optical assemblies 200-2 and 200-3 may correspond to any of the assemblies described with respect to FIG. 1E-1H, including or not including membrane 102. When optical assemblies 200-2 and 200-3 correspond to optical assemblies 120 and 130 of FIGS. 1E and 1F, all components including optical element 104, membrane 102 and substrate 112 are stretched as illustrated in FIGS. 2B and 2C. When optical assemblies 200-2 and 200-3 correspond to optical assembly 140 of FIG. 1G, substrate 112 and optical element 104 are stretched as illustrated in FIGS. 2B and 2C. In some embodiments, stretching described with respect to FIGS. 2B and 2C changes the surface area of optical assembly 200-1 by about 0.1% to about 10%, or, in some cases, by about 1% to about 5%.

In some embodiments, an optical assembly is stretched to change its optical properties. For example, optical assembly 200-2 stretched in one direction has distinct optical properties compared to optical properties of un-stretched optical assembly 200-1. Similarly, optical assembly 200-3 stretched in two directions has distinct optical properties compared to the optical properties of un-stretched optical assembly 200-1 and optical assembly 200-2 stretched in one direction. The optical properties include polarization selectivity, wavelength selectivity, angular selectivity, optical power, other optical properties and/or any combination of such optical properties. In some embodiments, the optical properties of optical element 202 are changed. For example, stretching of a PVH or GP element may change one or more of wavelength selectivity, polarization selectivity, and/or angular selectivity. In some embodiments the optical properties of substrate 204 are changed. For example, substrate 204 is an elastic lens, and stretching of substrate 204 will change a thickness of the lens thereby changing the optical power of the lens. In some embodiments, substrate 204 is made of a birefringent material, and stretching of substrate 204 will change the birefringent properties of substrate 204 thereby changing the polarizing properties of substrate 204. In some embodiments, substrate 204 is or includes membrane 102 described with respect to FIG. 1A (e.g., membrane 102 is an elastic OCA). In some embodiments, stretching of membrane 102 changes properties of membrane 102 (e.g., thickness) thereby changing optical properties of an optical assembly.

As explained above with respect to FIG. 1A, optical element 104 is a GP optical element or a PVH optical element. Exemplary embodiments of GP optical elements are described herein below with respect to FIGS. 3A-3D and 4A-4D and exemplary embodiments of PVH optical elements are described below with respect to FIGS. 5A-5D and 6A-6D.

FIGS. 3A-3D are schematic diagrams illustrating geometric phase lens 300 in accordance with some embodiments. In some embodiments, geometric phase lens 300 is a liquid crystal geometric phase element including a layer of liquid crystals. In some embodiments, geometric phase lens 300 includes a layer of other type of substructures, e.g., nanopillars composed of high refraction index materials or a layer of photopolymers. Geometric phase lens 300 adds or removes optical power based in part on polarization of incident light. For example, if right handed circularly polarized (RCP) light is incident on geometric phase lens 300, geometric phase lens 300 acts as a positive lens (i.e., it causes light to converge). And, if left handed circularly polarized (LCP) light is incident on the geometric phase lens, the geometric phase lens acts as a negative lens (i.e., it causes light to diverge). In some embodiments, the geometric phase lens also reverses the handedness of the incident light (e.g., changing LCP to RCP or vice versa). The geometric phase lens is also wavelength selective. If the incident light is at the designed wavelength, LCP light is converted to RCP light, and vice versa, while light with wavelength outside the designed wavelength range is transmitted without its polarization converted. The geometric phase lens may have a large aperture size and can be made with a very thin liquid crystal layer. Optical properties of the geometric phase lens (e.g., focusing power or diffracting power) are based on variation of azimuthal angles (θ) of anisotropic molecules. For example, for a geometric phase lens, azimuthal angle θ of an anisotropic molecule is determined based on Equation (1):

$$\theta = \left(\frac{r^2}{f} * \frac{\pi}{\lambda}\right)/2 \qquad (1)$$

where r denotes a radial distance between the anisotropic molecule and an optical center of the geometric phase lens, f denotes a focal distance, and λ denotes a wavelength of the light that the geometric phase is designed for. Thus, in some embodiments, the azimuthal angles of the anisotropic molecules in the x-y plane increase from the optical center to an edge of the geometric phase lens. In some embodiments, as expressed by Equation (1), a rate of increase in azimuthal angles between neighboring anisotropic molecules also increases with the distance from the optical center of the geometric phase lens. The geometric phase lens creates a respective lens profile based on the orientations (i.e., azimuthal angle θ) of an anisotropic molecule in the x-y plane. In contrast, an (non-geometric phase) anisotropic lens creates a lens profile via a birefringence property and a thickness of an anisotropic molecule layer.

Figure 3C:
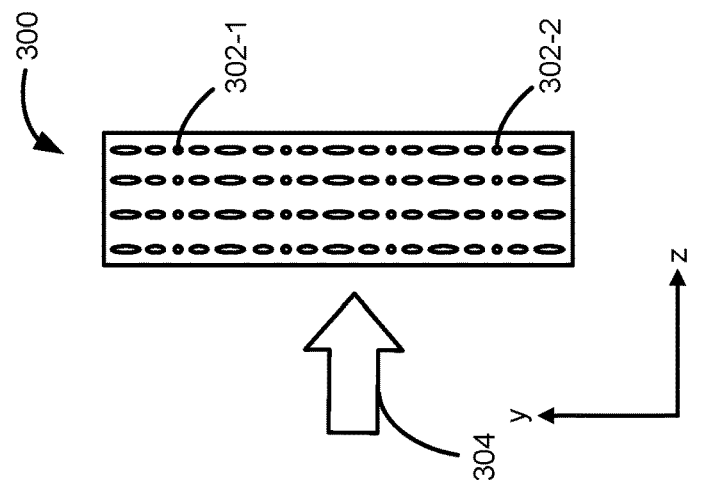
FIGS. 3A-3D are schematic illustrations of a geometric phase lens in accordance with some embodiments.
Figure 3B:
Figure 3B:
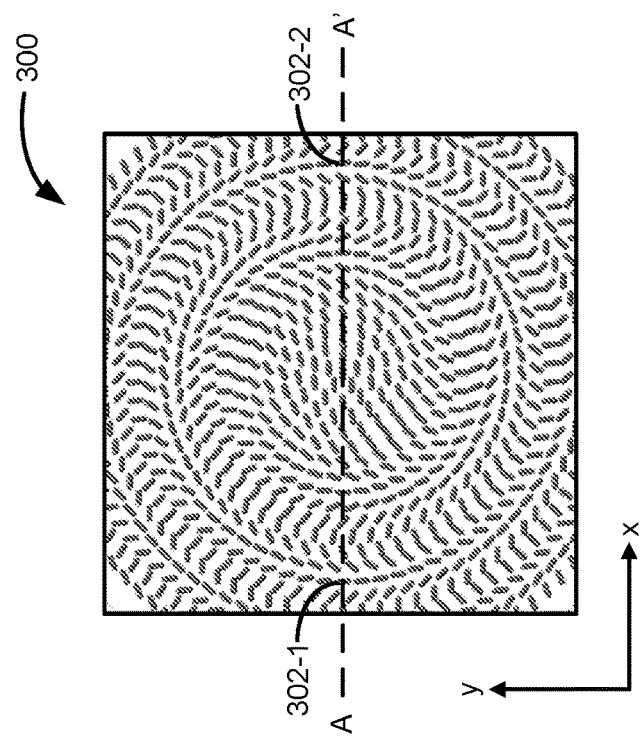
Figure 3D:
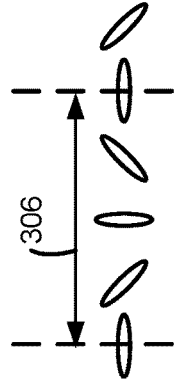
Figure 3A:
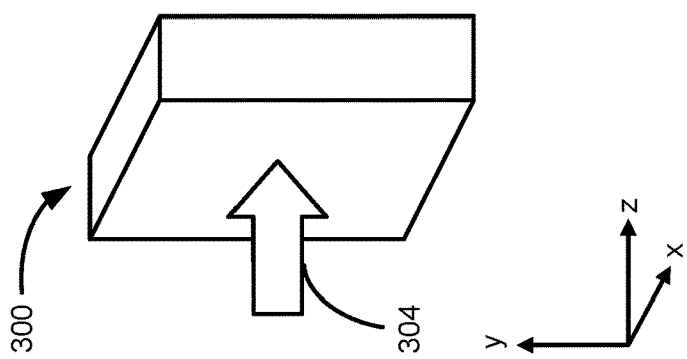

FIG. 3A illustrates a three dimensional view of geometric phase lens 300 with incoming light 304 entering the lens along the z-axis. FIG. 3B illustrates an x-y-plane view of geometric phase lens 300 with a plurality of anisotropic molecules (e.g., anisotropic molecules 302-1 and 302-2) with various orientations. In some embodiments, anisotropic molecules are liquid crystals or photosensitive molecules. The orientations (i.e., azimuthal angles θ) of the anisotropic molecules vary along reference line between A and A' from the center of geometric phase lens 300 toward the periphery of geometric phase lens 300. FIG. 3C illustrates an y-z-cross-sectional view of geometric phase lens 300. As shown in FIG. 3C, the orientations of the anisotropic molecules (e.g., anisotropic molecules 302-1 and 302-2) remain constant along z-direction. FIG. 3D illustrates a detailed plane view of the anisotropic molecules along the reference line between A and A' shown in FIG. 3B. Pitch 306 is defined as a distance along the x-axis at which the azimuth angle of an anisotropic molecule has rotated 180 degrees. In some embodiments, pitch 306 varies as a function of distance from the center of geometric phase lens 300. In a case of a lens, the azimuthal angle of anisotropic molecules varies in accordance with Equation (1) shown above. In such cases, the pitch at the center of the lens is longest and the pitch at the edge of the lens is shortest.

Figure 4A:
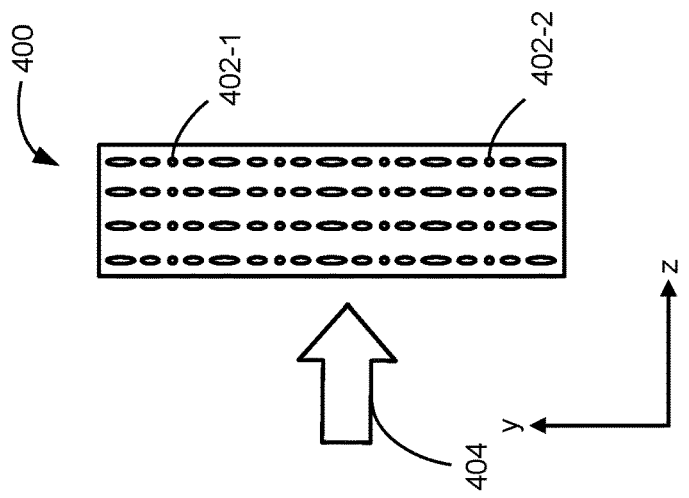
FIGS. 4A-4D are schematic illustrations of a geometric phase grating in accordance with some embodiments.
Figure 4B:
Figure 4C:
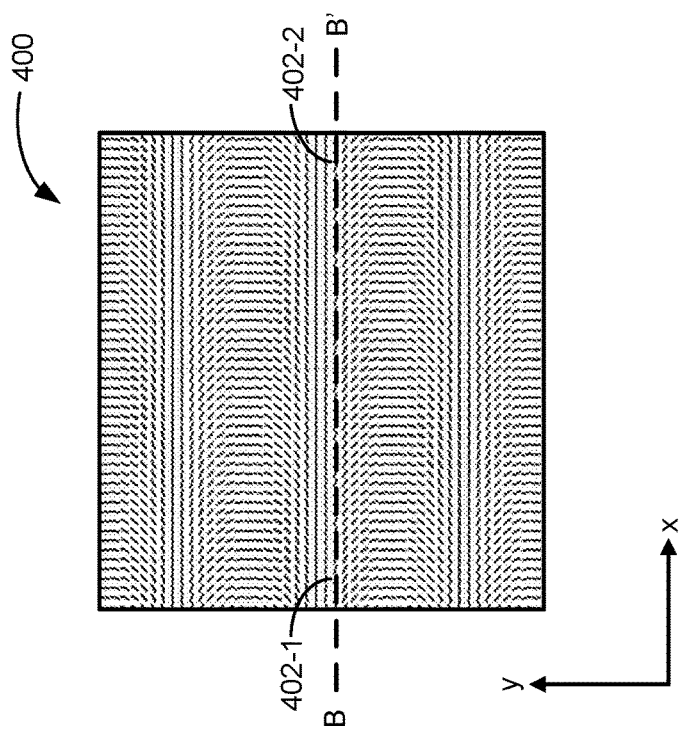
Figure 4D:
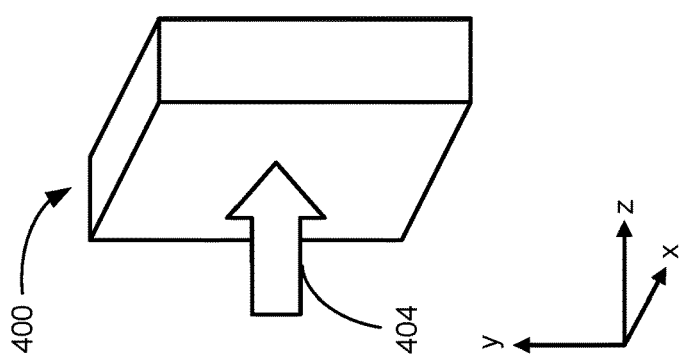

FIGS. 4A-4D are schematic diagrams illustrating geometric phase grating 400 in accordance with some embodiments. FIG. 4A illustrates a three dimensional view of geometric phase grating 400 with incoming light 404 entering the lens along the z-axis. FIG. 4B illustrates an x-y-plane view of geometric phase grating 400 showing a plurality of anisotropic molecules (e.g., anisotropic molecules 402-1 and 402-2) with various orientations in the geometric phase grating 400. In contrast to geometric phase lens 300 described above with respect to FIG. 3B, the orientations (i.e., azimuthal angles θ) of the anisotropic molecules are constant along reference line between B and B' along the x-axis, as shown in FIG. 4D illustrating a detailed plane view of the anisotropic molecules along the reference line. The orientations of the anisotropic molecules in FIG. 4B vary along the y-axis corresponding to the plane view of anisotropic molecules shown in FIG. 3D with respect to geometric phase lens 300. However, in a case of a grating, the pitch defined as a distance along the y-axis at which the azimuth angle of an anisotropic molecule has rotated 180 degrees is constant throughout the grating. FIG. 4C illustrates an y-z-cross-sectional view of geometric phase grating 400. As shown in FIG. 4C, the orientations of the anisotropic molecule (e.g., anisotropic molecules 402-1 and 402-2) remain constant along z-direction, similarly to lens 300 illustrated in FIG. 3C.

FIGS. 5A-5D are schematic diagrams illustrating PVH lens 500 in accordance with some embodiments. In some embodiments, PVH lens 500 is a liquid crystal PVH lens including a layer of liquid crystals in helical structures (e.g., cholesteric liquid crystals). Similar to a geometric phase lens, a PVH lens adds or removes optical power based in part on polarization of an incident light. However, PVH lens is selective with respect to circular polarization of light. When state (handedness) of the circularly polarized light is along a helical axis of a liquid crystal, the PVH lens interacts with the circularly polarized light and thereby changes the direction of the light (e.g., refracts or diffracts the light). Concurrently, the PVH lens also changes the polarization of the light. In contrast, the PVH lens transmits light with opposite circular polarization without changing its direction or polarization. For example, a PVH lens changes polarization of RCP light to LCP light and simultaneously focuses or defocuses the light while transmitting LCP light without changing its polarization or direction. Optical properties of the PVH lens (e.g., focusing power of diffracting power) are based on variation of azimuthal angles of anisotropic molecule molecules, as described above with respect to FIGS. 3A-3D. In addition, the optical properties of the PVH are based on a helical axis and/or a helical pitch of a helical structure.

Figure 5C:
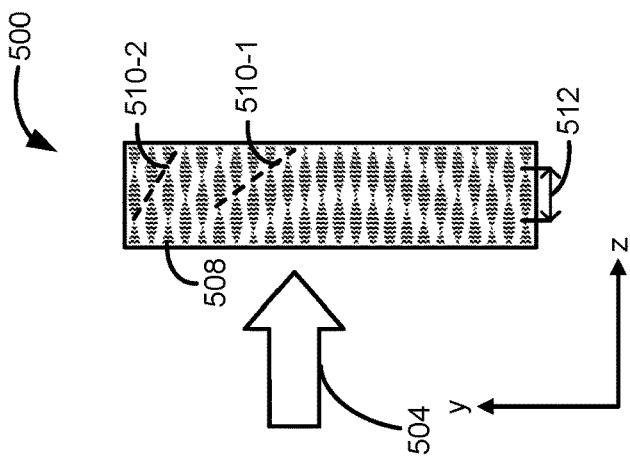
FIGS. 5A-5D are schematic illustrations of a polarization volume hologram lens in accordance with some embodiments.
Figure 5C:
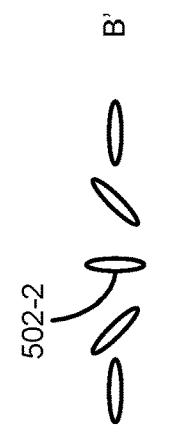
Figure 5B:
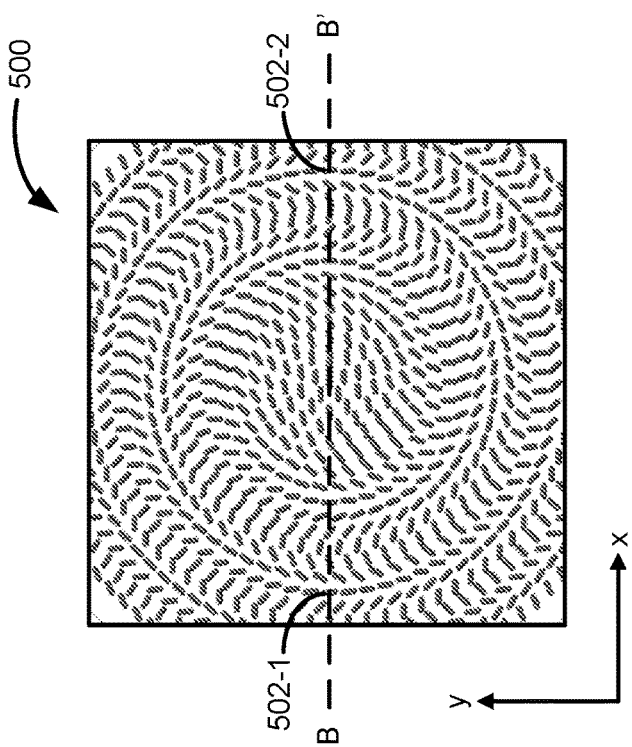
Figure 5D:
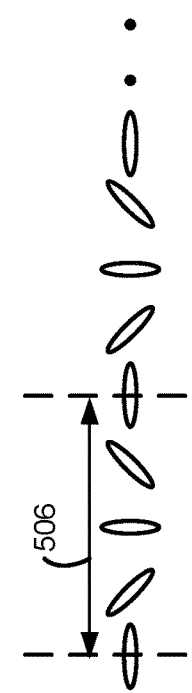
Figure 5A:
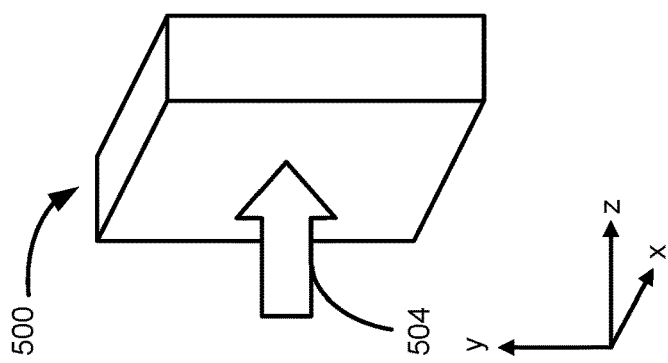

FIG. 5A illustrates a three dimensional view of PVH lens 500 with incoming light 504 entering the lens along the z-axis. FIG. 5B illustrates an x-y plane view of PVH lens 500 with a plurality of anisotropic molecules (e.g., anisotropic molecules 502-1 and 502-2) with various orientations. The orientations (i.e., azimuthal angle θ) of the anisotropic molecules vary along reference line between C and C' from the center of PVH lens 500 toward the periphery of PVH lens 500. FIG. 5C illustrates an y-z-cross-sectional view of PVH lens 500. As shown in FIG. 5C, in contrast to geometric phase lens described with respect to FIG. 3C, the anisotropic molecules (e.g., anisotropic molecules 502-1 and 502-2) of PVH lens 500 are arranged in helical structures 508. Helical structures 508 have helical axes aligned corresponding to the z-axis. As the azimuthal angle of respective anisotropic molecules on the x-y-plane varies, the helical structures create a volume grating with a plurality of tilted diffraction planes (e.g., planes 510-1 and 510-2). The diffraction planes (e.g., Bragg diffraction planes) defined in a volume of an PVH lens produce a periodically changing refractive index. Helical structures 508 define the polarization selectivity of PVH lens 500, as light with circular polarization handedness corresponding to the helical axis is diffracted while light with circular polarization with the opposite handedness is not diffracted. Helical structures 508 also define the wavelength selectivity of PVH 500, as light with wavelength close to a helical pitch (e.g., helical pitch 512 in FIG. 5C) is diffracted while light with other wavelengths is not diffracted. A helical pitch refers to a distance when a helix has made a 180 degree turn along a helical axis (e.g., the z-axis in FIG. 5C). FIG. 5D illustrates a detailed plane view of the anisotropic molecules along the reference line between C and C' in FIG. 5B. Pitch 506 is defined as a distance along x-axis at which the azimuth angle of anisotropic molecule has rotated 180 degrees from the initial orientation. In some embodiments, pitch 506 varies as a function of distance from the center of PVH lens 500. In a case of a lens, the azimuthal angle of anisotropic molecules varies in accordance with Equation (1) shown above. In such cases, the pitch at the center of the lens is the longest and the pitch at the edge of the lens is the shortest.

Figure 6A:
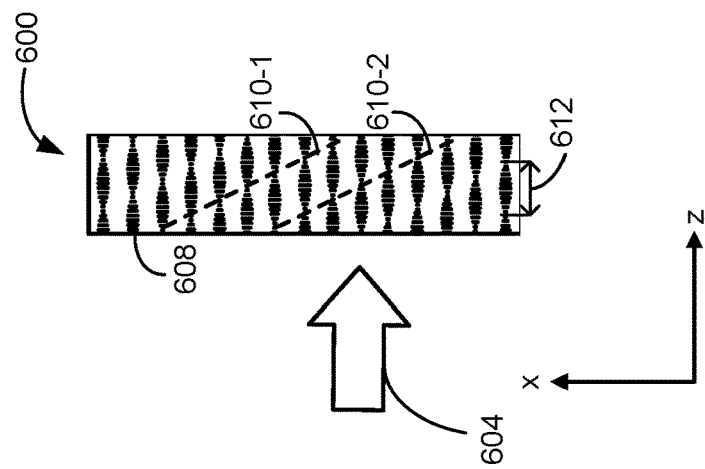
FIGS. 6A-6D are schematic illustrations of a polarization volume hologram grating in accordance with some embodiments.
Figure 6B:
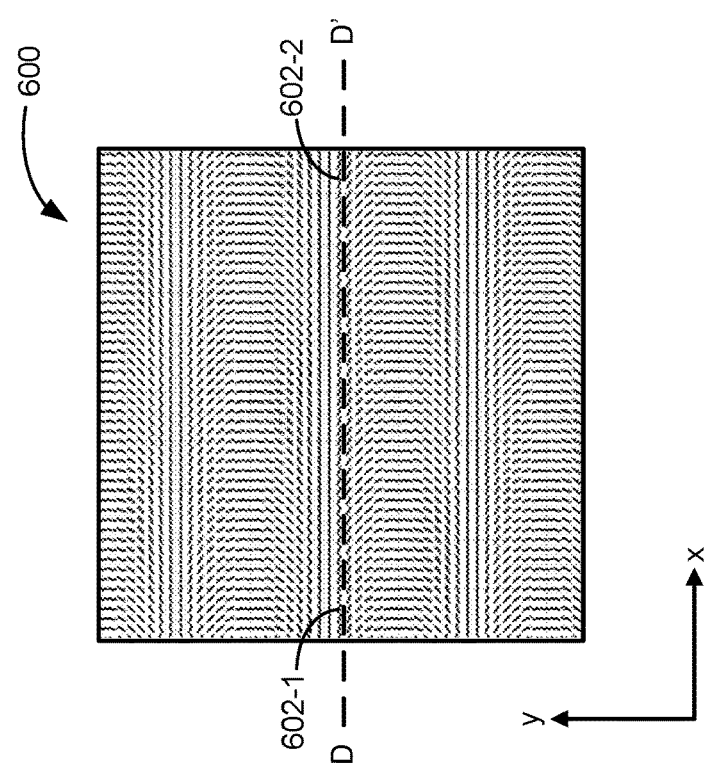
Figure 6C:
Figure 6D:
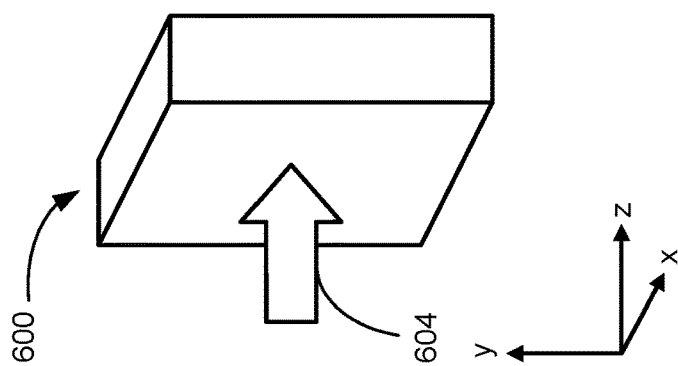

FIGS. 6A-6D are schematic diagrams illustrating PVH grating 600 in accordance with some embodiments. FIG. 6A illustrates a three dimensional view of PVH grating 600 with incoming light 604 entering the lens along the z-axis. FIG. 6B illustrates an x-y-plane view of PVH grating 600 with a plurality of anisotropic molecules (e.g., anisotropic molecules 602-1 and 602-2) with various orientations. In contrast to PVH lens 500 described above with respect to FIG. 5B, the orientations (i.e., azimuthal angles θ) of the anisotropic molecules are constant along reference line between D and D' along the x-axis, as shown in FIG. 6D illustrating a detailed plane view of the anisotropic molecules along the reference line. The orientations of the anisotropic molecules in FIG. 6B vary along the y-axis corresponding to the plane view of anisotropic molecules shown in FIG. 5D with respect to PVH lens 500. However, in a case of a grating, the pitch defined as a distance along the y-axis at which the azimuth angle of an anisotropic molecule has rotated 180 degrees is constant throughout the grating. FIG. 6C illustrates an y-z-cross-sectional view of PVH grating 600. In contrast to PVH lens 500 shown in FIG. 5C, PVH grating 600 has helical structures 608 with helical axes aligned corresponding to the x-axis. The helical structures create a volume grating with a plurality of diffraction planes (e.g., planes 610-1 and 610-2). In contrast to planes 510-1 and 510-2 shown in FIG. 5C for PVH lens 500, the diffraction planes of PVH grating 600 extend across the lens. In FIG. 6C, diffraction planes 610-1 and 610-2 are tilted with respect to the z-axis. As explained above with respect FIG. 5C, helical structures 608 define the polarization selectivity of PVH grating 600, as light with circular polarization handedness corresponding to the helical axes is diffracted while light with circular polarization with the opposite handedness is not diffracted. Helical structures 608 also define the wavelength selectivity of PVH grating 600, as light with wavelength close to a helical pitch (e.g., helical pitch 612 in FIG. 6C) is diffracted while light with other wavelengths is not diffracted.

In light of these principles, we now turn to certain embodiments.

In accordance with some embodiments, a method includes obtaining optical assembly including a first optical element and a first flexible membrane (e.g., optical assembly 105 includes optical element 104 and membrane 102 in FIG. 1C). The first optical element has a first optical element surface and a second optical element surface that is opposite to the first optical element surface (e.g., optical element 104 has surfaces 104-1 and 104-2). The first flexible membrane has a first membrane surface and a second membrane surface that is opposite to the first membrane surface (e.g., membrane 102 has surfaces 102-1 and 102-2). The first optical element is a geometric phase optical element (e.g., GP optical elements described below with respect to FIGS. 3A-3D and 4A-4D) or a polarization volume hologram optical element (e.g., PVH optical elements described below with respect to FIGS. 5A-5D and FIGS. 6A-6D). The second optical element surface of the first optical element is coupled with at least a first portion of the first membrane surface of the first flexible membrane (e.g., surface 104-1 of optical element 104 is coupled to surface 102-2 of membrane 102 in FIG. 1C). The method also includes coupling the first optical element with the first flexible membrane attached thereto to a target substrate (e.g., optical element 104 is coupled to substrate 108 by membrane 102 in FIG. 1D).

In some embodiments, the first optical element includes polymerized liquid crystals and/or photopolymers (e.g., anisotropic molecules 302-1 and 302-2 in FIG. 3C).

In some embodiments, coupling the first optical element to the target substrate includes coupling at least a second portion of the first membrane surface of the first flexible membrane to the target substrate (e.g., surface 102-2 of membrane 102 is coupled with substrate 112 in FIG. 1F).

In some embodiments, the first optical element is removably coupled with the first membrane surface of the first flexible membrane (e.g., an optically clear adhesive tape or a film with a low-tack pressure-sensitive adhesive) (e.g., optical assembly 130 incudes optical element 104 coupled with membrane 102 in FIG. 1F whereas in optical assembly 140 in FIG. 1G membrane 102 is removed). The method also includes coupling the first optical element surface of the first optical element to the target substrate (e.g., optical element 104 is coupled with substrate 112 in FIG. 1F, without placing membrane 102 between optical element 104 and substrate 112, as is shown in FIG. 1E). For example, one or more adhesives are applied to the first optical element surface of the first optical element and/or the target substrate so that the first optical element surface of the first optical element is attached to the target substrate. The method further includes, separating the first flexible membrane from the first optical element (and the target substrate) while the first optical element remains on the target substrate (e.g., FIGS. 1F and 1G). For example, the first flexible membrane is peeled off from the first optical element (and the target substrate).

In some embodiments, the first membrane surface of the first flexible membrane is coated with one or more adhesives (e.g., an optically clear adhesive and/or a low-tack pressure-sensitive adhesive) (e.g., surface 102-2 of membrane 102 is coated with one or more adhesives in FIG. 1B). In some cases, this enables and/or contributes to removable coupling of the first optical element to the first flexible membrane (e.g., membrane 102 is removable coupled with optical element 104 as illustrated in FIGS. 1F and 1G).

In some embodiments, coupling the first optical element to the target substrate includes coupling the second membrane surface of the first flexible membrane to the target substrate (e.g., optical element 104 is coupled to substrate 112 so that optical element 104 is coupled to surface 102-2 of membrane 102 and substrate 112 is coupled to surface 102-1 of membrane 102 in FIG. 1E). In some embodiments, the first flexible membrane is a double-sided tape positioned between the first optical element and the target substrate (e.g., membrane 102 is a double-sided tape in FIG. 1E).

In some embodiments, obtaining the first optical assembly includes forming the first optical element on a source substrate (e.g., optical element 104 is formed on substrate 106 in FIG. 1A) and coupling the first membrane surface of the first flexible membrane with the second optical element surface of the first optical element while the first optical element is located on the source substrate (e.g., surface 102-2 of membrane 102 is coupled with surface 104-1 of optical element 104 while optical element 104 is located on substrate 106 in FIG. 1B) and separating the first optical element from the source substrate, along with separating the first flexible membrane from the source substrate (e.g., optical element 104 is picked off from substrate 106 using membrane 102 in FIG. 1C).

In some embodiments, the first optical element with the first membrane attached thereto is coupled to a non-flat surface of the target substrate (e.g., substrate 108 is not flat in FIG. 1D).

In some embodiments, the target substrate is a lens (e.g., substrate 108 is a lens in FIG. 1D).

In some embodiments, the first optical assembly further includes a second optical element (e.g., optical element 154 in FIG. 1H) that is distinct and separate from the first optical element. The second optical element has a third optical element surface and a fourth optical element surface that is opposite to the third optical element surface (e.g., optical element 154 has surface 154-1 and surface 154-2). The second optical element is a geometric phase optical element or a polarization volume hologram optical element. The fourth optical element surface of the second optical element is coupled with at least a third portion of the first membrane surface of the flexible membrane (e.g., surface 154-2 is coupled with membrane 102 in FIG. 1J). The method further includes coupling the second optical element with the first flexible membrane attached thereto to the target substrate (e.g., FIG. 1J).

In some embodiments, the second optical element includes polymerized liquid crystals and/or photopolymers.

The method further includes coupling the second optical element to the target substrate concurrently with coupling the first optical element to the target substrate (e.g., optical element 154 is coupled to membrane 112 in FIG. 1J). For example, both the first optical element and the second optical element are located (e.g., side-by-side) on the first membrane surface of the first flexible membrane, and are transferred together to the target substrate. As result, the second optical element is coupled to the target substrate using a method analogous to the method used for coupling the first optical element to the target substrate.

In some embodiments, the method includes obtaining a second optical assembly (e.g., FIG. 1H) including a second optical element and a second flexible membrane, the second optical element having a third optical element surface and a fourth optical element surface that is opposite to the third optical element surface. The second flexible membrane has a third membrane surface and a fourth membrane surface that is opposite to the third membrane surface. The second optical element is a geometric phase optical element or a polarization volume hologram optical element. The fourth optical element surface of the second optical element is coupled with at least a first portion of the third membrane surface of the second flexible membrane. The method further includes coupling the second optical element to the first optical element on the target substrate (e.g., optical element 154 is coupled with optical element 104 in FIG. 1H).

In some embodiments, the method further includes coupling the third surface of the second optical element to the first surface of first optical element (e.g., optical element 154 is directly coupled with optical element 104 without placing membrane 152 between optical element 154 and optical element 104 in FIG. 1I).

In some embodiments, coupling the second optical element to the first optical element on the target substrate comprises coupling at least a portion of the fourth membrane surface of the second flexible membrane to at least a portion of the first optical element surface of the first optical element (e.g., membrane 152 is located between optical element 104 and optical element 154 in FIG. 1H).

In some embodiments, the first flexible membrane is elastic (e.g., membrane 102 in FIG. 1C). The method further includes stretching the first optical element along with the first flexible membrane before coupling the first optical element with the first flexible membrane attached thereto to the target substrate (e.g., non-stretched optical assembly 200-1 in FIG. 2C is stretched as optical assemblies 200-2 and 200-3 in FIGS. 2B-2C, respectively). In some embodiments, this causes the one or more optical properties of the first optical element to change.

In some embodiments, the method includes stretching the first optical element and the first flexible membrane prior to coupling the first optical element to the target substrate (e.g., stretching optical element 104 and membrane 102 prior to coupling to substrate 112 in FIG. 1E). In some embodiments, the first optical element is coupled to the target substrate while the first optical element remains stretched.

In some embodiments, the first optical element and the first flexible membrane are stretched in a first direction (e.g., FIG. 2B) without stretching the first optical element and the first flexible membrane in a second direction that is distinct from the first direction (e.g., the second direction is perpendicular to the first direction).

In some embodiments, the first optical element and the first flexible membrane are stretched in both the first direction and the second direction (e.g., FIG. 2C).

In some embodiments, the target substrate is elastic (e.g., substrate 112 in FIG. 1G). The method further includes, subsequent to coupling the first optical element to the target substrate, stretching the first optical element along with the target substrate (e.g., stretching optical element 104 along with substrate 112 in FIG. 1G). In some embodiments, this causes the one or more optical properties of the first optical element to change.

In some embodiments, the method includes stretching the first optical element along with the first flexible membrane and the target substrate (e.g., while the first flexible membrane remains in contact with the target substrate and/or the first flexible membrane) (e.g., stretching optical element 104, membrane 102 and substrate 112 in FIG. 1E).

In some embodiments, the first flexible membrane is separated from the first optical element (and the target substrate) subsequent to coupling the first optical element to the target substrate (e.g., membrane 102 of FIG. 1F is peeled off or lifted off from optical element 104 in FIG. 1G), and the method includes stretching the first optical element along with the target substrate without stretching the first flexible membrane (e.g., stretching optical element 104 and substrate 112 in FIG. 1G).

In some embodiments, the first optical element is stretched in a first direction without stretching the first optical element in a second direction that is distinct from the first direction (e.g., the second direction is perpendicular to the first direction) (e.g., FIG. 2B).

In some embodiments, the first optical element is stretched in both the first direction and the second direction (e.g., FIG. 2C).

In accordance with some embodiments, an optical assembly includes a first optical element having a first optical element surface and a second optical element surface that is opposite to the first optical element surface (e.g., optical assembly 105 in FIG. 1C). The first optical element is a geometric phase optical element or a polarization volume hologram optical element. The optical assembly also includes a first flexible membrane having a first membrane surface and a second membrane surface that is opposite to the first membrane surface. The second optical element surface of the first optical element is coupled with at least a first portion of the first membrane surface of the first flexible membrane.

In some embodiments, the optical assembly further includes a target substrate. At least a second portion of the first membrane surface of the first flexible membrane is coupled to the target substrate (e.g., FIG. 1F).

In some embodiments, the first optical element (e.g., optical element 104 in FIG. 1C) of the assembly includes polymerized liquid crystals and/or photopolymers.

In some embodiments, the optical assembly further includes a target substrate. The second membrane surface of the first flexible membrane is coupled to the target substrate (e.g., FIG. 1E).

In some embodiments, the target substrate has a non-flat surface and the second membrane surface of the first flexible membrane is coupled to the non-flat surface of the target substrate (e.g., FIG. 1D).

In some embodiments, the optical assembly further includes a second optical element having a third optical element surface and a fourth optical element surface that is opposite to the third optical element surface. The second optical element is a geometric phase optical element or a polarization volume hologram optical element. The optical assembly also includes a second flexible membrane having a third membrane surface and a fourth membrane surface that is opposite to the third membrane surface, and the fourth optical element surface of the second optical element is coupled with at least a first portion of the third membrane surface of the second flexible membrane. The second optical element is coupled with the first optical element (e.g., FIG. 1I).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:
1. An optical assembly, comprising:
   a first flexible membrane;
   a first optical element coupled with at least a first portion of the first flexible membrane;
   a substrate having a curved surface, wherein the first optical element is coupled to the curved surface of the substrate with the first flexible membrane;
   a second flexible membrane distinct from the first flexible membrane; and a second optical element coupled with at least a portion of the second flexible membrane.

2. The optical assembly of claim 1, wherein:
the at least a first portion of the first flexible membrane is positioned between the first optical element and the curved surface of the substrate.

3. The optical assembly of claim 1, wherein:
the first optical element is positioned between the first flexible membrane and the curved surface of the substrate so that at least a second portion, distinct from the first portion, of the first flexible membrane is in direct contact with the curved surface of the substrate.

4. The optical assembly of claim 1, wherein:
the substrate is an elastic substrate, wherein the first optical element is stretchable along with stretching the elastic substrate coupled thereto.

5. The optical assembly of claim 4, wherein:
the first optical element is an elastic lens and stretching the first optical element along with stretching the elastic substrate coupled thereto changes a thickness of the elastic lens thereby changing an optical power of the elastic lens.

6. The optical assembly of claim 4, wherein:
the first optical element is made of a birefringent material and stretching the first optical element along with stretching the elastic substrate coupled thereto changes polarizing properties of the first optical element.

7. The optical assembly of claim 1, wherein:
the first optical element includes a layer of liquid crystals oriented by a photoalignment method or by a holographic alignment method.

8. The optical assembly of claim 7, wherein:
the layer of liquid crystals includes liquid crystals arranged in a plurality of helical structures, the layer of liquid crystals configured to redirect light having a first circular polarization while transmitting light having a polarization distinct from the first circular polarization.

9. The optical assembly of claim 1, wherein:
the first optical element includes a layer of photopolymers or a layer of nanopillars composed of high refraction index materials.

10. The optical assembly of claim 1, wherein:
the first flexible membrane is an optically clear adhesive tape of a film with a low-tack pressure-sensitive adhesive.

11. The optical assembly of claim 1, wherein:
the first optical element is configured to redirect light with a first wavelength range and the second optical element is configured to redirect light with a second wavelength range distinct from the first wavelength range.

12. The optical assembly of claim 1, wherein:
the first optical element and the second optical element are both lenses, gratings, or axicons.

13. The optical assembly of claim 1, wherein:
the first optical element has a first set of optical properties and the second optical element has a second set of optical properties that is distinct from the first set of optical properties, wherein a respective set of optical properties includes wavelength selectivity, polarization selectivity, and/or angular selectivity.

14. The optical assembly of claim 1, wherein:
the first optical element and the second optical element are in direct contact with each other and disposed between the first flexible membrane and the second flexible membrane.

15. The optical assembly of claim 1, wherein:
the second flexible membrane is disposed between the first optical element and the second optical element, and the second flexible membrane is in direct contact with the first optical element and the second optical element.

16. An optical assembly, comprising:
a first flexible membrane;
a first optical element coupled with at least a first portion of the first flexible membrane;
a substrate having a curved surface, wherein the first optical element is coupled to the curved surface of the substrate with the first flexible membrane; and
a second optical element coupled with at least a second portion of the first flexible membrane distinct from the first portion of the first flexible membrane, the second optical element positioned adjacent to the first optical element.

17. A method for making an optical assembly, the method comprising:
obtaining a first flexible membrane and a first optical element;
coupling the first optical element with at least a first portion of the first flexible membrane; and
coupling, with the first flexible membrane, the first optical element to a curved surface of a substrate, wherein coupling, with the first flexible membrane, the first optical element to the curved surface of the substrate includes positioning the first optical element between the first flexible membrane and the curved surface of the substrate so that at least a second portion, distinct from the first portion, of the first flexible membrane is in direct contact with the curved surface of the substrate.

18. The optical assembly of claim 16, wherein:
the at least a first portion of the first flexible membrane is positioned between the first optical element and the curved surface of the substrate.

19. The optical assembly of claim 16, wherein:
the first optical element includes a layer of liquid crystals oriented by a photoalignment method or by a holographic alignment method.

20. The optical assembly of claim 16, wherein:
the first optical element includes a layer of photopolymers or a layer of nanopillars composed of high refraction index materials.

* * * * *